United States Patent [19]
Baba et al.

[11] Patent Number: 6,008,563
[45] Date of Patent: Dec. 28, 1999

[54] RELUCTANCE MOTOR AND COMPRESSOR-DRIVING RELUCTANCE MOTOR

[75] Inventors: Kazuhiko Baba; Hitoshi Kawaguchi; Yoshio Takita; Hayato Yoshino, all of Tokyo, Japan

[73] Assignee: Mitsubishi Denki Kabushiki Kaisha, Tokyo, Japan

[21] Appl. No.: 09/116,265

[22] Filed: Jul. 16, 1998

[30] Foreign Application Priority Data

Oct. 29, 1997 [JP] Japan ................................... 9-297243

[51] Int. Cl.⁶ .............................. H02K 1/16; H02K 3/46; H02K 3/52
[52] U.S. Cl. ........................... 310/254; 310/194; 310/214; 310/216
[58] Field of Search ..................... 310/214, 215, 310/216, 179, 180, 162, 165, 166, 168, 184, 254, 258, 259, 194

[56] References Cited

U.S. PATENT DOCUMENTS

| | | | |
|---|---|---|---|
| 1,608,314 | 11/1926 | Hibbard | 310/218 |
| 4,015,156 | 3/1977 | Johrde | 310/214 |
| 4,496,293 | 1/1985 | Nakamura et al. | 417/371 |
| 4,761,581 | 8/1988 | Watanabe et al. | 310/214 |
| 5,763,978 | 6/1998 | Uchida et al. | 310/215 |

FOREIGN PATENT DOCUMENTS

| | | | |
|---|---|---|---|
| 4038028 | 4/1992 | Germany | H02K 3/52 |
| 2-65056 | 5/1990 | Japan | H02K 3/52 |
| 5-176504 | 7/1993 | Japan | H02K 19/10 |

OTHER PUBLICATIONS

Patent Abstract of Japan, vol. 005, No. 145 (E–074), Japanese Patent Document No. 56–78358, Sep. 12, 1981.
Patent Abstracts of Japan, vol. 007, No. 136 (E–181), Japanese Patent Document No. 58–49051, Jun. 14, 1983.
Patent Abstracts of Japan, vol. 014, No. 584 (E–1018), Japanese Patent Document No. 2–254941, Oct. 15, 1990.

*Primary Examiner*—Nestor Ramirez
*Assistant Examiner*—Burt Mullins
*Attorney, Agent, or Firm*—Burns, Doane, Swecker & Mathis, LLP

[57] ABSTRACT

Winding holding means 8 for retaining windings 6 are respectively provided at axially opposite end portions of each pole protrusion 5 of a stator on the inner peripheral side of the pole protrusions.

6 Claims, 12 Drawing Sheets

RELUCTANCE MOTOR AND COMPRESSOR-DRIVING RELUCTANCE MOTOR

BACKGROUND OF THE INVENTION

1. Field of the Invention

The present invention relates to a reluctance motor used for driving a compressor of such as an air conditioner or a refrigerator.

2. Description of the Related Art

As the structure of a typical reluctance motor, one shown in FIG. 18 is conventionally well known. Referring to FIG. 18, a description will be given hereafter of the structure of the conventional reluctance motor.

FIG. 18 is a cross-sectional view illustrating a general reluctance motor, in which reference numeral 1 denotes a rotor shaft; 2 denotes a rotor; 3a, 3b, 3c, and 3d denote pole protrusions of the rotor; 4 denotes a stator; 5a, 5b, . . . , 5f denote pole protrusions of the stator; 6 denotes a stator winding; 7 denotes a gap between the stator 4 and the rotor 2; 12 denotes a groove provided in the stator 4; and 13 denotes an insulating portion surrounding the groove 12.

The rotor 2 is formed by laminated steel plates which are laminated in the direction of the rotating shaft 1, and the rotor 2 has around the rotor shaft 1 a plurality of, e.g., four, pole protrusions 3a, 3b, 3c, and 3d arranged at equal intervals and having equal shapes. The stator 4 is formed by laminated steel plates which are laminated in the direction of the rotating shaft 1 in the same way as the rotor 2. The stator 4 is arranged around the rotor 2 with the gap 7 therebetween, and has a plurality of, e.g., six, pole protrusions 5a, 5b, . . . , 5f arranged at equal intervals and having equal shapes. The stator winding 6 is wound around each of the pole protrusions 5a, 5b, . . . , 5f of the stator. Generally, each of the pole protrusions 5a, 5b, . . . , 5f of the stator has a straight-sided pole profile in which its lateral faces are parallel with each other.

Next, referring to FIG. 19, a description will be given of the basic principle of the driving of the reluctance motor having the above-described configuration. In the drawing, STEP 1, STEP 2, and STEP 3 show states in which the relative positional relationships between the rotor 2 and the stator 4 differ. STEP 1 shows a state in which the pole protrusion 5a of the stator and the pole protrusion 3a of the rotor are remote from each other, while STEP 2 and STEP 3 show states in which the pole protrusion 5a of the stator and the pole protrusion 3a of the rotor are close to each other. If the winding of a phase A is excited in the direction shown in the drawing when the pole protrusion 5a of the stator and the pole protrusion 3a of the rotor are located in the state shown in STEP 1, the magnetic flux is headed from a corner of the tooth of the pole protrusion 5a of the stator toward a corner of the tooth of the pole protrusion 3a of the rotor, passes along the path indicated by the broken line in the drawing, and flows while being curved. At this time, since the magnetic line of force is in an unstable state, and magnetic attraction acts in a magnetically stable direction in which the magnetic flux flows straightly, the rotor 2 moves in the direction of arrows.

When the rotor 2 reaches the position of STEP 2 which is magnetically most stable, the magnetic attraction ceases to act in the circumferential direction and acts only in the radial direction, so that torque does not occur. Accordingly, by changing over the energizing phase from phase A to phase B, the pole protrusion 5f of the stator and the pole protrusion 3d of the rotor are set in a state of being spaced apart from each other, and produce the magnetically unstable state again, thereby producing a torque. For this reason, the rotor 2 moves in the direction of the arrow shown in STEP 3.

In the above-described manner, the rotor 2 can be rotatively driven by consecutively changing over the energizing phases of the windings in correspondence with the positions of the pole protrusions 3 of the rotor 3. At this time, if it is assumed that the winding current is i, the number of turns is N, the winding inductance is L, and the position of the rotor is θ, then the torque T which is generated in the range where magnetic saturation does not occur can be expressed by Formula (1):

$$T = \tfrac{1}{2} \cdot (N \cdot i)^2 \cdot dL/d\theta \tag{1}$$

Namely, torque is proportional to the square of the winding current and the change in the winding inductance with respect to the position of the rotor. In particular, the change in the inductance is a term which is largely ascribable to the tooth profiles of the pole protrusions 3 of the rotor and the pole protrusions 5 of the stator. That is, to make the torque large, it is desirable to enlarge the salient pole ratio (Lmax/Lmin), i.e., the ratio between the inductance at the position where the teeth of the pole protrusion 3 of the rotor and the pole protrusion 5 of the stator are aligned with each other with respect to the energizing phase (maximum inductance: Lmax) and the inductance at the position where the teeth of the pole protrusion 3 of the rotor and the pole protrusion 5 of the stator are most remote from each other (minimum inductance: Lmin). For this reason, with the conventional reluctance motor, the tooth profile of each of the pole protrusions 3 and 5 has parallel straight sides from the standpoint of improvement of the salient pole ratio.

In addition, FIGS. 20 and 21 show a variable reluctance motor disclosed in Japanese Utility Model Application Laid-Open No. 65056/1990. FIG. 20 is a side elevational view schematically illustrating the conventional variable reluctance motor, and FIG. 21 is a perspective view, partly in section, of the stator. In the drawings, reference numeral 1 denotes the rotor shaft; 2 denotes the rotor; 3a, 3b, 3c, and 3d denote the pole protrusions of the rotor; 4 denotes the stator; 5a, 5b, and 5c denote the pole protrusions of the stator; 6 denotes the winding; 19a and 19b denote projecting portions; 20 denotes a retaining member; and 21 denotes a retaining portion.

As shown in the drawings, the stator 4 has a plurality of pole protrusions 5 on its inner peripheral side, and the winding 6 is wound around each pole protrusion 5. The rotor 2 is disposed on the inner peripheral side of the stator 4, and the plurality of pole protrusions 3 are provided on its outer peripheral side. The retaining members 20 which are formed from an insulating material are respectively retained in such a manner as to straddle the pole protrusions 5, and abut against the windings 6 wound around the respective pole protrusions, so as to prevent the windings 6 from coming off the pole protrusions 5.

In addition, FIG. 22 is a cross-sectional view schematically illustrating the conventional compressor-driving motor. In the drawing, reference numeral 1 denotes the rotor shaft; 2, the rotor; 4, the stator; 6, the winding; and 22, a slotted portion.

The conventional compressor-driving motor is constituted by an induction motor, a permanent magnet-type motor, or the like, and its rotor has the structure of a round cross section, as shown in FIG. 22. For this reason, in the case where the motor is used as the compressor-driving motor, the outer peripheral portion of the stator 4 is not formed with a completely circular shape, but is provided with the slotted portions 22.

The conventional reluctance motor configured as described above has had the following problems.

With the reluctance motor sown in FIG. 18, since the tooth profile of each pole protrusion 5 of the stator has a parallel straight-sided shape, it is difficult to hold the windings 6, and if an attempt is made to increase the space factor of the windings 6, there occurs a failure such as the slipping off of the windings 6 to the inner peripheral side of the stator 4, thereby hampering the improvement of the space factor. Further, if the space factor is made unduly large, the windings 6 bulge to the inner peripheral side of the stator 4, giving rise to the failure such as that it becomes impossible for the rotor 2 to be incorporated on the inner peripheral side of the stator 4. For this reason, with the conventional stator 4 having the straight sides, it has been inevitable to make the space factor of the windings 6 small. Namely, it has been necessary to decrease the wire diameter of the windings 6 or reduce the number of turns. This results in an increase in the winding resistance and an increase in the winding current, so that there have been problems in that the copper loss increases, and the efficiency declines.

In addition, with the reluctance motor shown in FIGS. 20 and 21, the projecting portions 19*a* and 19*b*, which project in the circumferential direction, are provided at inner peripheral end portions of each pole protrusion 5 of the stator so as to prevent the windings 6 from slipping off by means of these projecting portions 19*a* and 19*b*, thereby facilitating the holding of the windings 6. These projecting portions 19*a* and 19*b* are provided at all the inner peripheral end portions of the pole protrusions 5 of the stator over the entire axial length.

As described above, the reluctance motor has a double salient pole structure in which both the stator 4 and the rotor 2 have pole protrusions, and it has been clarified through experiments and magnetic-field analysis that, to bring out the torque most effectively, in light of the improvement of the salient pole ratio it is desirable to make substantially equal the dimensions of the tooth width of the pole protrusion 5 of the stator and the groove width of the stator 4 and make substantially equal the dimensions of the tooth width of the pole protrusion 5 of the stator and the tooth width of the pole protrusion 3 of the rotor. However, in the structure of the projecting portions 19*a* and 19*b* provided over the entire axial length, the tooth width of the pole protrusion 5 of the stator becomes large relative to the groove width of the stator 4, resulting in a decline in the salient pole ratio necessary for effectively bringing out the torque. Consequently, to obtain the same torque, a greater current is conventionally required, causing an increase in copper loss and deteriorating the efficiency.

In addition, the stator of the compressor-driving motor is provided with the slotted portions 22 in the outer peripheral portion of the stator to secure passages for a refrigerant gas, but these slotted portions 22 makes the core back portion of the stator thin. As a result, the magnetic flux density of the core back portion increases, which deteriorates the magnetic characteristics, resulting in an increase in iron loss.

SUMMARY OF THE INVENTION

The present invention has been devised to overcome the above-described problems, and an object of the present invention is to obtain a highly efficient reluctance motor which facilitates the holding of the windings, and causes no decline in the salient pole ration while improving the space factor.

Another object of the present invention is to obtain a highly efficient reluctance motor which is capable of reducing the iron loss due to the arrangement having the slotted portions in the outer peripheral portion of the stator in the compressor-driving motor.

In accordance with a first arrangement of the present invention, there is provided a reluctance motor provided with a stator which has a plurality of pole protrusions provided on an inner peripheral side thereof and around each of which a winding is wound as well as a rotor which is disposed on the inner peripheral side of the stator and has a plurality of pole protrusions on an outer side thereof, comprising: winding holding means provided respectively at axially opposite end portions of each of the pole protrusions of the stator so as to hold the windings respectively wound around the pole protrusions on inner peripheral sides of the pole protrusions.

In accordance with a second arrangement of the present invention, the reluctance motor in the first arrangement further comprises: winding holding means provided between the axially opposite end portions of each of the pole protrusions of the stator independently of the winding holding means provided respectively at axially opposite end portions of each of the pole protrusions of the stator.

In accordance with a third arrangement of the present invention, in the reluctance motor in the first or second arrangement, the winding holding means is constituted by retaining portions which are respectively provided on side surfaces of an inner peripheral-side end portion of each of the pole protrusions of the stator.

In accordance with a fourth arrangement of the present invention, the reluctance motor in the third arrangement further comprises: winding holding members each retained by retaining portions provided on the inner peripheral-side end portions of adjacent ones of the pole protrusions to hold the windings on inner peripheral sides of the windings.

In accordance with a fifth arrangement of the present invention, in the reluctance motor in the fourth arrangement, the winding holding member at each axial end portion is inserted between the adjacent ones of the pole protrusions of the stator from an axial end portion side, and has a stopper portion indicating the termination of insertion by retaining the axial end portion and a sleeve portion which is tapered such that the radial thickness of its inserted-side distal end becomes thinner.

In accordance with a sixth arrangement of the present invention, in the reluctance motor in the fourth or fifth arrangement, each of the retaining portions is formed by a slot.

In accordance with a seventh arrangement of the present invention, the reluctance motor in any one of the first to sixth arrangements further comprises: winding holding members each disposed between adjacent ones of the windings and formed of an insulating material.

In accordance with an eighth arrangement of the present invention, in the reluctance motor in any one of the third to seventh arrangements, the stator is formed by a plurality of laminated plates which are laminated in the axial direction, and the laminated plates at each of the axially opposite end portions are arranged such that the laminating plates provided with the retaining portions on the side surfaces of the inner peripheral-side end and the laminating plates having straight side surfaces are alternately laminated in units of one or more plates of a same kind to constitute the winding holding means.

In accordance with a ninth arrangement of the present invention, there is provided a compressor-driving reluctance motor comprising: a reluctance motor provided with a stator which has a plurality of pole protrusions provided on an inner peripheral side thereof and around each of which a winding is wound as well as a rotor which is disposed on the inner peripheral side of the stator and has a plurality of pole protrusions on an outer side thereof; a casing for accommodating the reluctance motor; a suction pipe for introducing a heat transfer medium into the casing; and a discharge pipe for leading the heat transfer medium out of the casing, wherein an outer peripheral portion of the stator of the reluctance motor is made almost completely circular, and the heat transfer medium introduced from the suction pipe is circulated through a gap between the stator and the rotor, and is led out from the discharge pipe.

DETAILED DESCRIPTION OF THE PREFERRED EMBODIMENTS

Figure 1:
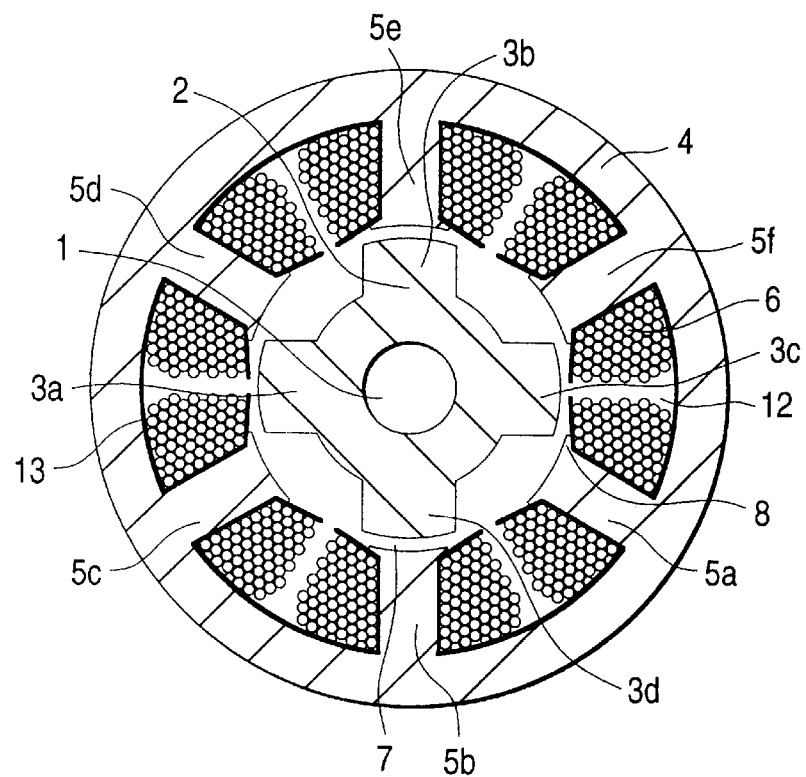
FIG. 1 is a cross-sectional view illustrating a reluctance motor in accordance with a first embodiment.

Hereafter, a description will be given of the embodiments of the present invention with reference to the drawings. In the drawings, portions which are denoted by the same reference numerals denote identical or corresponding component elements.

First Embodiment

Figure 2:
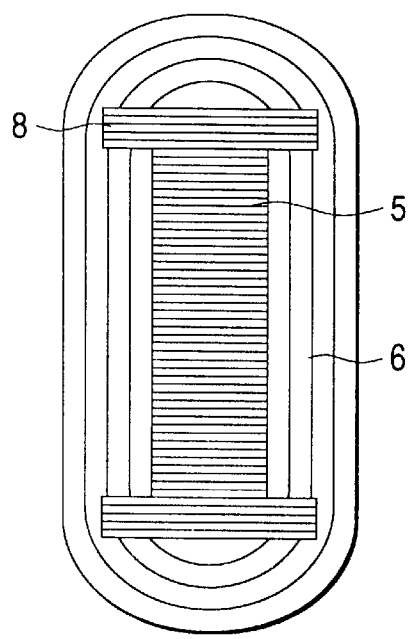
FIG. 2 is a partial side view in which the pole protrusion of the stator in accordance with the first embodiment is viewed from the inner peripheral side.

Hereafter, a description will be given of the reluctance motor in accordance with a first embodiment of the present invention. FIGS. 1 and 2 are diagrams illustrating the reluctance motor in accordance with the first embodiment, in which FIG. 1 is a cross-sectional view illustrating the reluctance motor in accordance with this embodiment, and FIG. 2 is a partial side view in which the pole protrusion of the stator in accordance with the first embodiment is viewed from the inner peripheral side.

In the drawing, reference numeral 1 denotes a rotor shaft; 2 denotes a rotor; 3a, 3b, 3c, and 3d denote pole protrusions of the rotor; 4 denotes a stator; 5a, 5b, 5c, . . . , 5f denote pole protrusions of the stator; 6 denotes a winding wound around each of the pole protrusions 5 of the stator; 7 denotes a gap between the stator 4 and the rotor 2; 8 denotes a winding holding means, e.g., a winding holding portion; 12 denotes a groove provided in the stator 4; and 13 denotes an insulating portion surrounding the groove 12.

In the reluctance motor in accordance with this embodiment, the rotor 2 is arranged around the outer periphery of the rotor shaft 1, and has on its outer periphery a plurality of, e.g., four, pole protrusions 3a, 3b, 3c, and 3d of the rotor arranged at equal intervals and having equal shapes. The stator 4 is arranged around the outer peripheral side of the rotor 2 with the gap 7 therebetween, and has on its inner peripheral side a plurality of, e.g., six, pole protrusions 5a, 5b, 5c, . . . , 5f of the stator arranged at equal intervals and having equal shapes. In addition, the insulating portion 13 formed of, for instance, insulating paper is provided around each of the grooves 12 adjacent to the pole protrusions 5a, 5b, 5c, . . . , 5f of the stator. The winding 6 is wound around each of the pole protrusions 5a, 5b, . . . , 5f of the stator. Each of the rotor 2 and the stator 4 is formed by laminated steel plates which are laminated in the axial direction.

As shown in FIG. 2, the winding holding portions 8 for holding the winding wound around the pole protrusion are provided at axially opposite end portions of each pole protrusion 5 of the stator on the inner peripheral side of the pole protrusion. The winding holding portions 8 are retaining portions which are provided on opposite side surfaces of inner peripheral end portions of each pole protrusion 5, and are arranged such that a distal end portion of the pole protrusion 5 becomes convex in the circumferential direction. The winding wound around the pole protrusion 5 is retained by the holding portions 8, and can be prevented from slipping off the distal end portion of the pole protrusion 5. It should be noted that, as for the axial thickness of the winding holding portion 8 forming the convex shape and provided on each inner peripheral side surface of the pole protrusion, it suffices if the thickness provides strength sufficient to withstand the pressure acting on the inner peripheral side of the winding 6. In addition, opposite side surfaces of the pole protrusion 5 of the stator at portions other than the axially opposite end portions are configured in the same straight shape as in the conventional example.

As described above, with the reluctance motor in accordance with this embodiment, the winding holding portions 8 are provided at the respective axially opposite end portions of each pole protrusion of the stator. By virtue of such a simple structure, the holding of the windings 6 is facilitated, the windings 6 are prevented from slipping off the pole protrusions 5 of the stator during a winding operation, and the windings 6 are prevented from bulging toward the inner peripheral side more than the inner periphery of the stator, thereby facilitating the winding operation.

In addition, the winding holding portions 8 are not provided over the entire axial length of the pole protrusion 5, and the shape of each pole protrusion at portions other than the axially opposite end portions of the pole protrusion 5 of the stator is configured in the same straight shape as in the conventional example. For this reason, at portions where the winding holding portions 8 are not provided, dimensions of the tooth width of the pole protrusion 5 of the stator and the groove width of the stator are substantially equal, and dimensions of the tooth width of the pole protrusion 5 of the stator and the tooth width of the pole protrusion 3 of the rotor are substantially equal. Therefore, the structure is very desirable for generating torque effectively. Accordingly, it is possible to realize an efficient reluctance motor without causing a decline in the salient pole ratio. At the same time, due to the fact that the holding of the windings 6 is facilitated, it is possible to improve the space factor of the windings 6, so that it is possible to realize a highly efficient reluctance motor in which the copper loss is reduced.

Figure 22:
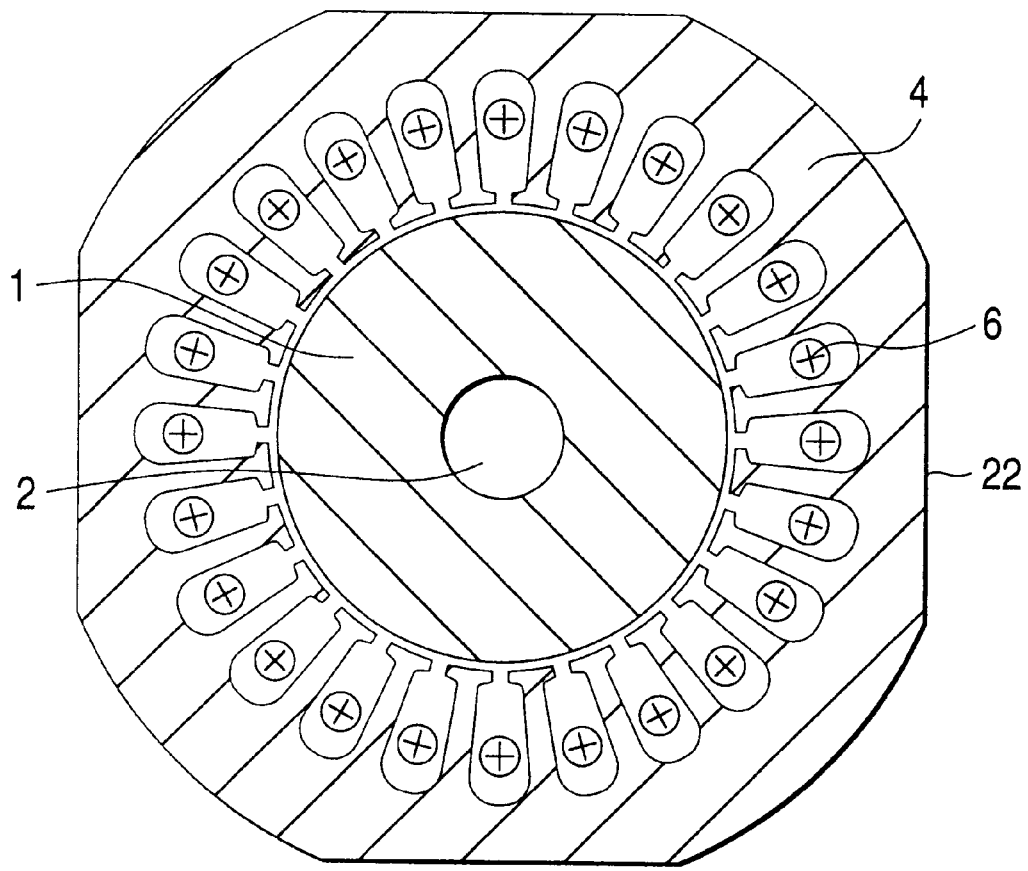
FIG. 22 is a cross-sectional view illustrating the stator of a conventional compressor-driving motor.

In addition, in the case where the conventional reluctance motor is used as the compressor-driving reluctance motor, since the cross section of the conventional rotor has a round shape as shown in FIG. 22, the slotted portions are provided in the outer peripheral portion of the stator to secure passages for a refrigerant gas, i.e., a heat transfer medium. However, in the case where the reluctance motor in accordance with this embodiment is used as the compressor-driving motor, in the rotor 2 disposed on the inner peripheral side of the stator 4, the structure provided is such that a large space portion is provided between, for instance, the pole protrusion 3a and its adjacent pole protrusion 3b, so that such space portions can be used as passages for the refrigerant gas. For this reason, the conventional slotted portions become unnecessary. Therefore, it is possible to restrain an increase in the magnetic flux density of the core back portion of the stator, so that it is possible to realize a reluctance motor having excellent magnetic characteristics and a low iron loss.

Second Embodiment

Figure 3:
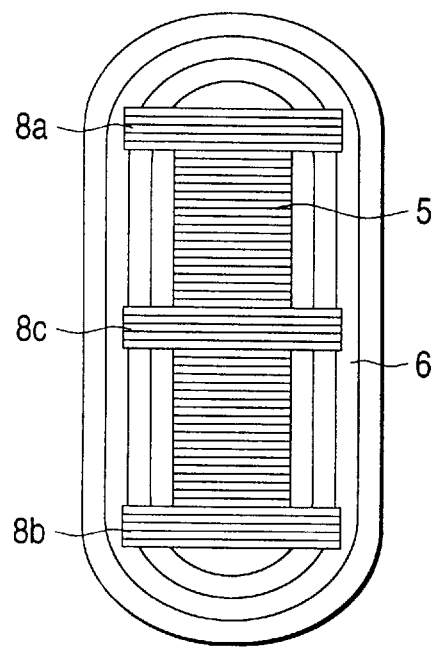
FIG. 3 is a partial side view in which the pole protrusion of the stator in accordance with second embodiment of the present invention is viewed from the inner peripheral side.

Hereafter, a description will be given of the reluctance motor in accordance with a second embodiment of the present invention. FIG. 3 is a partial side view in which the pole protrusion of the stator in accordance with this embodiment is viewed from the inner peripheral side. Although the arrangement provided in the first embodiment is such that the winding holding portions are provided only at the axially opposite end portions of each pole protrusion of the stator, this embodiment is characterized in that the winding holding means is provided also in an axially central portion of the stator. For instance, winding holding portions 8a and 8b are respectively provided at axially opposite end portions of the pole protrusion 5, and a winding holding portion 8c is also provided in the axially central portion of the pole protrusion 5 independently thereof.

As described above, with the reluctance motor in this embodiment, the winding holding portions 8a, 8b, and 8c are respectively provided at the axially opposite end portions and the axially central portion of each pole protrusion of the stator. For this reason, the holding of the windings 6 is facilitated, the windings 6 are prevented from slipping off the pole protrusions 5 of the stator during the winding operation, and the windings 6 are prevented from bulging toward the inner peripheral side more than the inner periphery of the stator, thereby facilitating the winding operation. In particular, with the reluctance motor in accordance with this embodiment, since the axially central portions of the windings 6 are also held by the winding holding portions 8c, the arrangement is effective for a motor having a large axially layered thickness, i.e., a motor in which the circumference of the winding is long. Since the arrangement provided is such that the winding holding portions 8 are also provided between the axially opposite end portions of the stator in correspondence with the layered thickness, as necessary, it is possible to more reliably obtain an effect similar to that of the first embodiment.

In this embodiment as well, the winding holding portions are not provided over the entire axial length of the pole protrusion 5, and the shape of each pole protrusion at portions other than the axially opposite end portions and the axially central portion of the pole protrusion 5 of the stator is configured in the same straight shape as in the conventional example. For this reason, at portions where the winding holding portions 8 are not provided, dimensions of the tooth width of the pole protrusion 5 of the stator and the groove width of the stator are substantially equal, and dimensions of the tooth width of the pole protrusion 5 of the stator and the tooth width of the pole protrusion 3 of the rotor are substantially equal. Therefore, the structure is very desirable for generating torque effectively. Accordingly, it is possible to realize an efficient reluctance motor without causing a decline in the salient pole ratio. At the same time, due to the fact that the holding of the windings 6 is facilitated, it is possible to improve the space factor of the windings 6, so that it is possible to realize a highly efficient reluctance motor in which the copper loss is reduced.

Although, in this embodiment, the winding holding portions 8a and 8b are respectively provided at the axially opposite end portions of the stator, and a single winding holding portion 8c is provided in the central portion therebetween, it goes without saying that if a plurality of winding holding portion 8c are provided between the axially opposite end portions of the stator, it is possible to obtain an effect similar to that of the first embodiment in terms of the holding of the windings. However, from the standpoint of the salient pole ratio, the winding holding portions 8 should be preferably provided in a minimum number that allows the windings 6 to be held.

Third Embodiment

Figure 4:
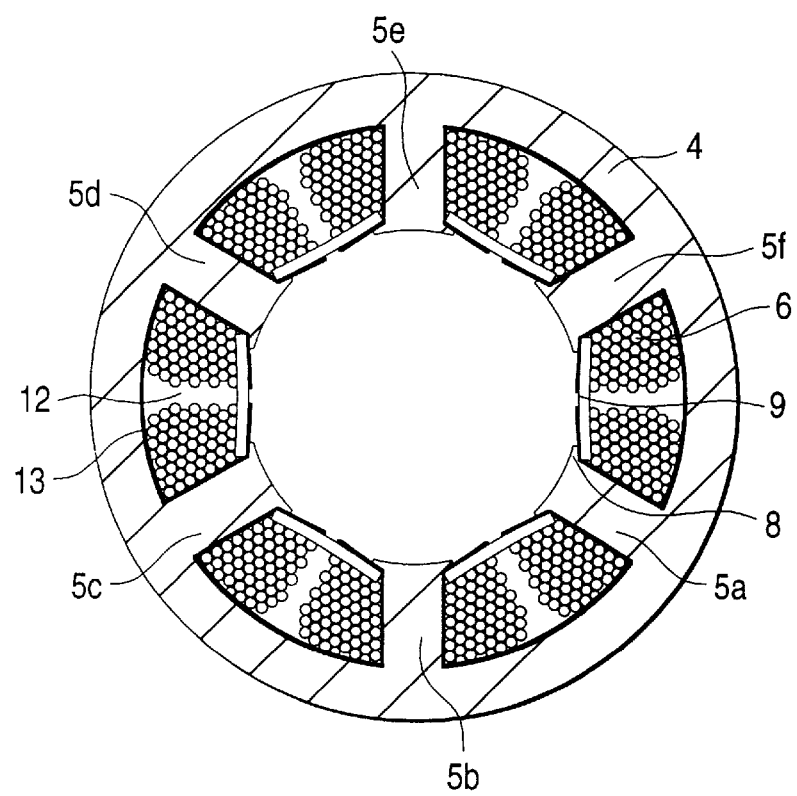
FIG. 4 is a cross-sectional view illustrating the stator in accordance with a third embodiment of the present invention.
Figure 5:
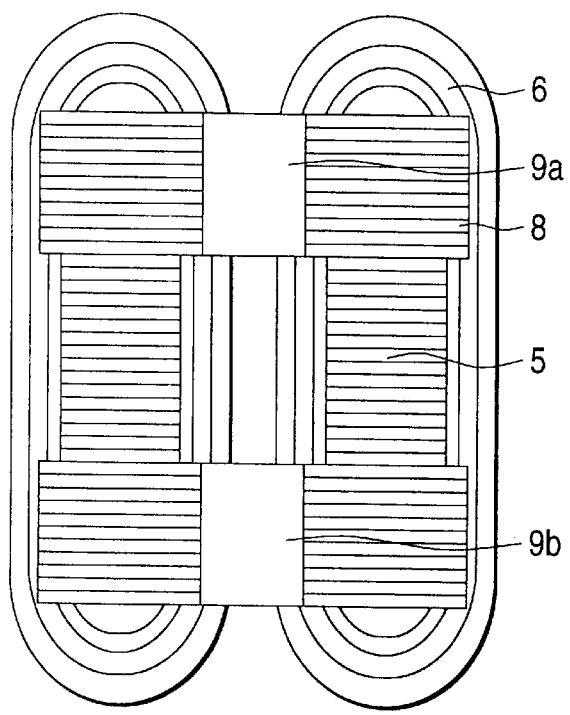
FIG. 5 is a partial side view in which pole protrusions of the stator in accordance with the third embodiment are viewed from the inner peripheral side.

Hereafter, a description will be given of the reluctance motor in accordance with a third embodiment of the present invention. FIGS. 4 and 5 are diagrams illustrating the reluctance motor in accordance with the third embodiment, in which FIG. 4 is a cross-sectional view illustrating the stator, and FIG. 5 is a partial side view in which pole protrusions of the stator are viewed from the inner peripheral side.

In the drawing, reference numeral 4 denotes the stator; 5a, 5b, 5c, . . . , 5f denote the pole protrusions of the stator; 6 denotes the winding; 7 denotes the gap; 8 denotes the winding holding portion; 9, 9a, and 9b denote winding holding members formed of an insulator; 12 denotes the groove; and 13 denotes the insulating portion.

The reluctance motor in accordance with this embodiment has a plurality of, e.g., six, pole protrusions 5a, 5b, 5c, ..., 5f of the stator arranged at equal intervals and having equal shapes, and the winding holding portions 8 forming the convex shape in the circumferential direction are provided on both side surfaces of inner peripheral-side distal end portions of each pole protrusion. These winding holding portions 8 are arranged at the axially opposite end portions of the pole protrusion 5 of the stator, as shown in FIG. 5. At this time, the shape of the pole protrusion 5 at portions other than the axially opposite end portions is configured in the parallel straight shape. In addition, the winding holding members 9a and 9b are formed of an insulator or a nonmagnetic material such as a resin, and are retained by the retaining portions which are the winding holding portions 8 provided on the inner peripheral-side end portions of adjacent ones of the pole protrusions, e.g., the pole protrusions 5a and 5f. The winding holding members 9a and 9b are disposed between the winding 6 and the winding holding portions 8, and hold the winding 6 from the inner peripheral side. Incidentally, the insulating portion 13 is disposed around the groove 12 adjacent to the pole protrusions 5a, 5b, 5c, ..., 5f of the stator.

The winding holding members 9a and 9b are disposed at the axially opposite end portions of the pole protrusion 5 of the stator in the same way as the winding holding portions 8.

With the reluctance motor in accordance with this embodiment configured as described above, the winding holding members 9a and 9b are respectively provided at the axially opposite end portions of each pole protrusion 5 of the stator where the largest stress of the winding 6 is applied. For this reason, the holding of the windings 6 is facilitated, the windings 6 are prevented from slipping off the pole protrusions 5 of the stator, and the windings 6 are prevented from bulging toward the inner peripheral side more than the inner periphery of the stator, thereby facilitating the winding operation.

In addition, since the shape of the pole protrusion at portions other than the axially opposite end portions of the pole protrusion 5 of the stator is configured in the parallel straight shape, the reluctance motor in accordance with this embodiment does not experience a decrease in efficiency which is otherwise caused by a decline in the salient pole ratio. In addition, the space factor of the windings 6 can be improved, so that it is possible to realize a highly efficient reluctance motor in which the copper loss is reduced. Further, because the windings 6 are held securely, the rigidity of the stator 4 improves, thereby making it possible to realize a reluctance motor with low vibration.

Fourth Embodiment

Figure 6:
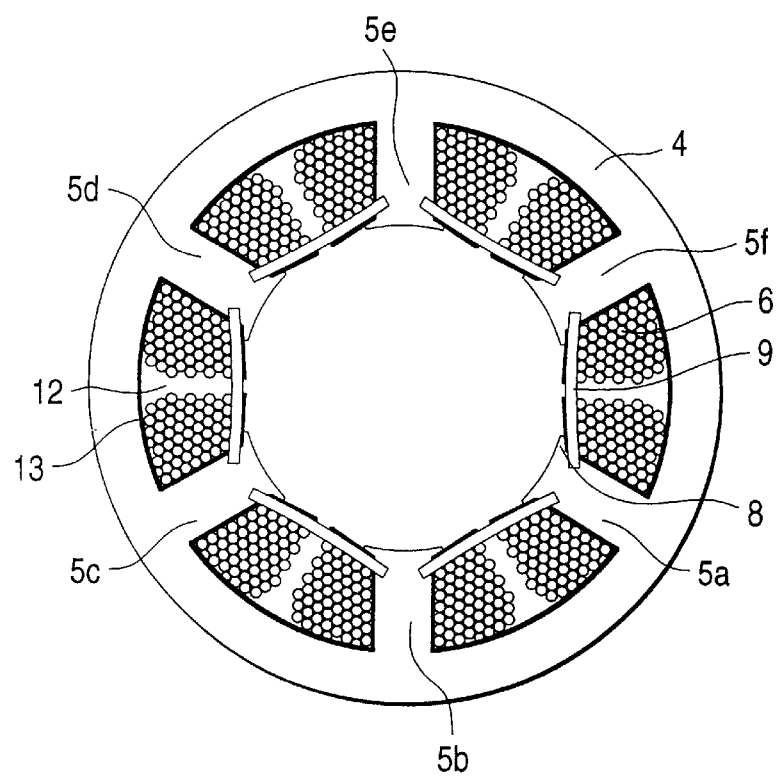
FIG. 6 is a top view illustrating the stator in accordance with a fourth embodiment of the present invention.
Figure 7:
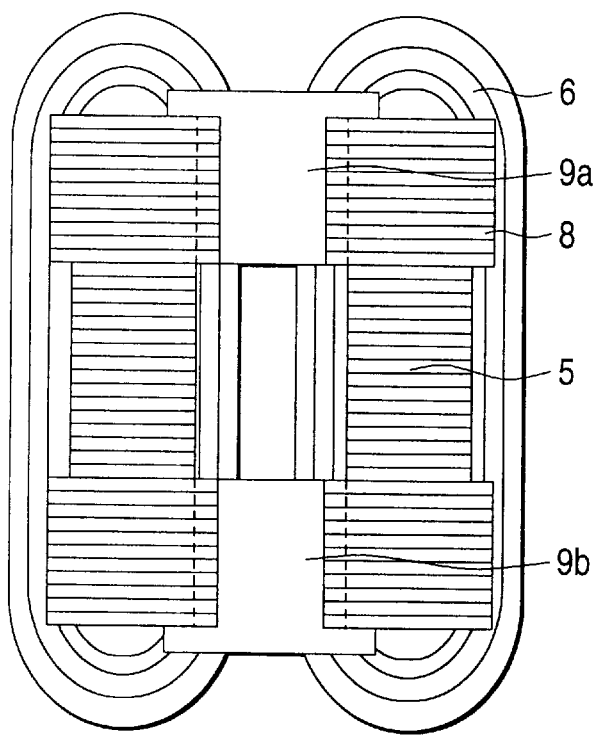
FIG. 7 is a partial side view in which pole protrusions of the stator in accordance with the fourth embodiment are viewed from the inner peripheral side.
Figure 8:
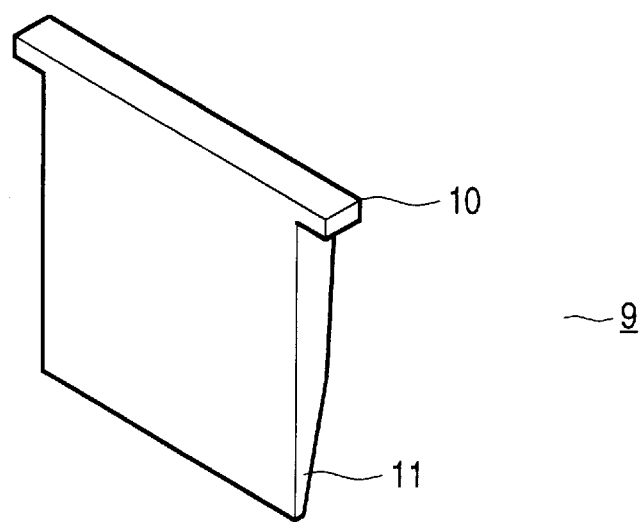
FIG. 8 is a perspective view illustrating a winding holding member in accordance with the fourth embodiment.

Hereafter, a description will be given of the reluctance motor in accordance with a fourth embodiment of the present invention. FIGS. 6, 7, and 8 are diagrams illustrating the reluctance motor in accordance with the fourth embodiment. FIG. 6 is a top view in which end portions of the windings of the stator sectioned, FIG. 7 is a partial side view in which pole protrusions of the stator are viewed from the inner peripheral side, and FIG. 8 is a perspective view illustrating the winding holding member 9.

In this embodiment, the winding holding members 9a and 9b at the axial end portions are inserted into the space between the winding holding portions 8 and the windings 6 from the axial end sides in such a manner as to straddle the adjacent pole protrusions of the stator. Each of the winding holding members 9a and 9b has a stopper portion 10 which is retained at the axial end to indicate the completion of insertion as well as a sleeve portion 11 which is tapered such that the radial thickness of its inserted-side distal end becomes thinner. The inclination formed on the sleeve portion 11 may be provided on either the inner peripheral side or the outer peripheral side, or on both sides.

As the winding holding members 9a and 9b are arranged as described above, it is possible to obtain an effect similar to that of the third embodiment. Further, by virtue of the tapered sleeve portion 11, the insertion of the winding holding members 9a and 9b from the axial end side is facilitated, and the winding holding member 9 can always be fixed reliably in place, thereby making it possible to realize a reluctance motor in which the windings 6 are held firmly. For this reason, the rigidity of the stator 4 improves, with the result that a reluctance motor with low vibration can be obtained.

It should be noted that although, in FIG. 7, the axial length where the winding holding portion 8 is provided and the axial length of each of the winding holding members 9a and 9b are arranged to be of equal length, the present invention is not limited to the same, and the axial length of the portion where the winding holding portion 8 is provided may be longer or shorter than the axial length of each of the winding holding members 9a and 9b.

Fifth Embodiment

Figure 9:
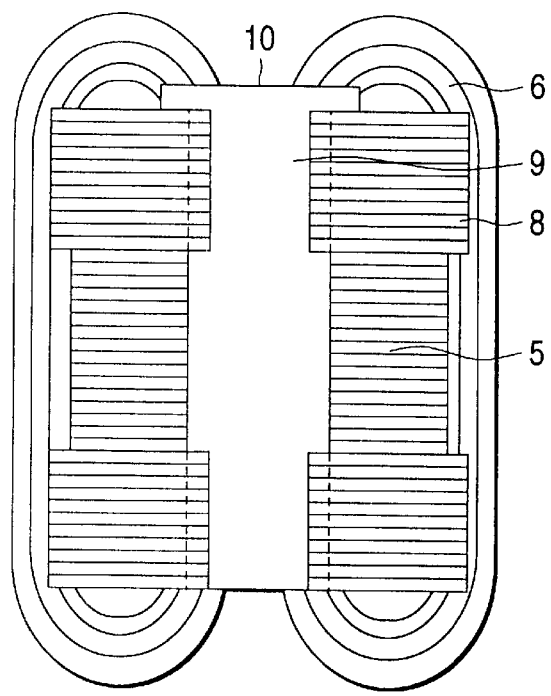
FIG. 9 is a partial side view in which pole protrusions of the stator in accordance with a fifth embodiment are viewed from the inner peripheral side.

Hereafter, a description will be given of the reluctance motor in accordance with a fifth embodiment of the present invention. FIG. 9 is a partial side view in which pole protrusions of the stator in accordance with this embodiment are viewed from the inner peripheral side.

Although, in the fourth embodiment, the winding 6 is held by the two winding holding members 9a and 9b at the axially opposite end portions of the stator 4, a continuous winding holding member 9 is provided in this embodiment. The winding holding portions 8 relating to the salient pole ratio, however, are respectively provided also at the axially opposite end portions of the pole protrusion 5 of the stator, so that the reluctance motor in accordance with this embodiment does not experience a decrease in efficiency which is otherwise caused by a decline in the salient pole ratio. In addition, the space factor of the windings 6 can be improved in the same way as in the fourth embodiment, so that it is possible to realize a highly efficient reluctance motor in which the copper loss is reduced. Further, since the winding holding member 9 is formed by a single member, the windings 6 are held by the winding holding member 9 from one axial end to the other end of the stator 4. For this reason, the holding of the windings 6 is facilitated, the windings 6 at portions where the winding holding portions 8 are not provided are prevented from slipping off the pole protrusions 5 of the stator, and the windings 6 are prevented from bulging toward the inner peripheral side more than the inner periphery of the stator, thereby facilitating the winding operation. Further, because the windings 6 are held securely, the rigidity of the stator 4 improves, thereby making it possible to realize a reluctance motor with low vibration. In addition, the operation of inserting the winding holding member 9 is effected from one axial end, so that further improvement of the operating efficiency can be realized.

Sixth Embodiment

Figure 10:
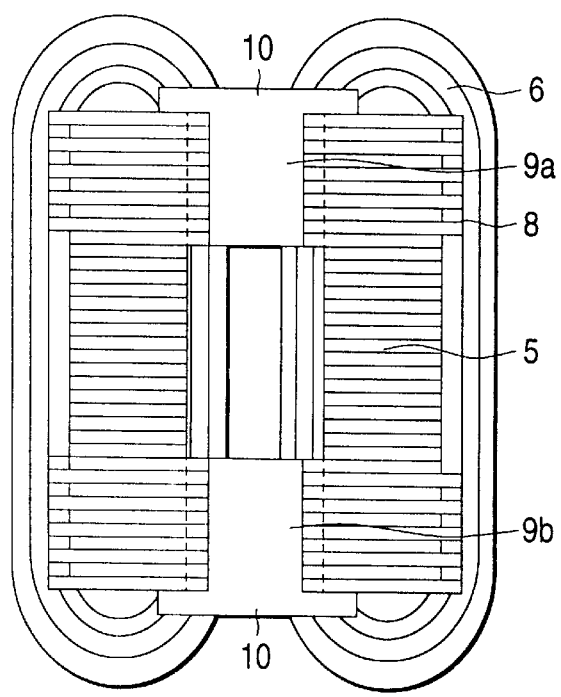
FIG. 10 is a partial side view in which pole protrusions of the stator in accordance with a sixth embodiment are viewed from the inner peripheral side.

Hereafter, a description will be given of the reluctance motor in accordance with a sixth embodiment of the present invention. FIG. 10 is a partial side view in which pole protrusions of the stator in accordance with this embodiment are viewed from the inner peripheral side. This embodiment shows a modification of the winding holding means which are respectively provided at the axially opposite end portions of the pole protrusion 5 of the stator. The stator 4 is formed by laminated plates which are laminated in the axial direction, and the laminated plates at each axially opposite end portion are arranged such that laminating plates provided with retaining portions at inner peripheral-side ends and laminating plates having straight side surfaces are alternately laminated to constitute the winding holding means, e.g., the winding holding portion 8. Thus, the difference with the fourth embodiment is that pole protrusion portions each having the winding holding portions 8 forming a convex shape in the circumferential direction on both side surfaces of the inner peripheral-side distal end portion of the pole protrusion of the stator and pole protrusion portions each having a parallel and straight shape are laminated alternately.

With the reluctance motor configured as described above, since the pole protrusion portions of the stator having the winding holding portions 8 and pole protrusion portions of the stator having a parallel and straight shape are laminated alternately, the proportion of the pole protrusion 5 portions of the stator having the winding holding portions 8 with respect to the axial length is reduced, thereby making it possible to improve the salient pole ratio. As a result, it is possible to realize a reluctance motor having higher efficiency.

Seventh Embodiment

Figure 11:
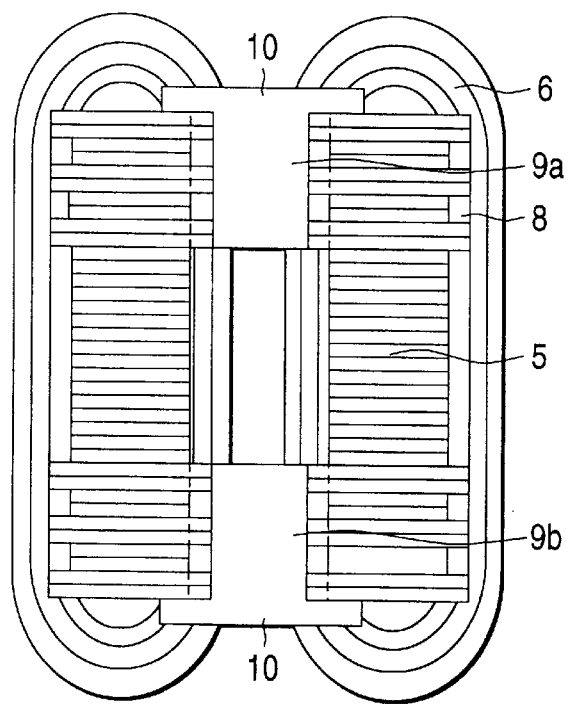
FIG. 11 is a partial side view in which pole protrusions of the stator in accordance with a seventh embodiment are viewed from the inner peripheral side.

Hereafter, a description will be given of the reluctance motor in accordance with a seventh embodiment of the present invention. FIG. 11 is a partial side view in which pole protrusions of the stator in accordance with the seventh embodiment are viewed from the inner peripheral side. This embodiment shows a modification of the winding holding means which are respectively provided at the axially opposite end portions of the pole protrusion 5 of the stator. The stator 4 is formed by laminated plates which are laminated in the axial direction, and the laminated plates at each axially opposite end portion are arranged such that laminating plates provided with retaining portions at inner peripheral-side ends and laminating plates having straight side surfaces are alternately laminated in units of two plates of the same kind to constitute the winding holding means, e.g., the winding holding portion 8. Thus, the difference with the sixth embodiment is that pole protrusion portions each having the winding holding portions and pole protrusion portions each having a parallel and straight shape are laminated alternately not in units of one plate of the same kind but in units of two plates of the same kind.

With the reluctance motor configured as described above, in the same way as in the sixth embodiment, the proportion of the pole protrusion 5 portions of the stator having the winding holding portions 8 with respect to the axial length is reduced, thereby making it possible to improve the salient pole ratio. As a result, it is possible to realize a reluctance motor having higher efficiency.

It should be noted that although, in this embodiment, the pole protrusion portions each having the winding holding portions at each axially opposite end portion of the pole protrusion of the stator and pole protrusion portions each having a parallel and straight shape are laminated alternately in units of two plates of the same kind, the present invention is not limited to units of two plates, and it goes without saying that a similar effect can be obtained even if an arrangement is provided such that the laminating plates are laminated alternately in units of three or more plates of the same kind.

Eighth Embodiment

Figure 12:
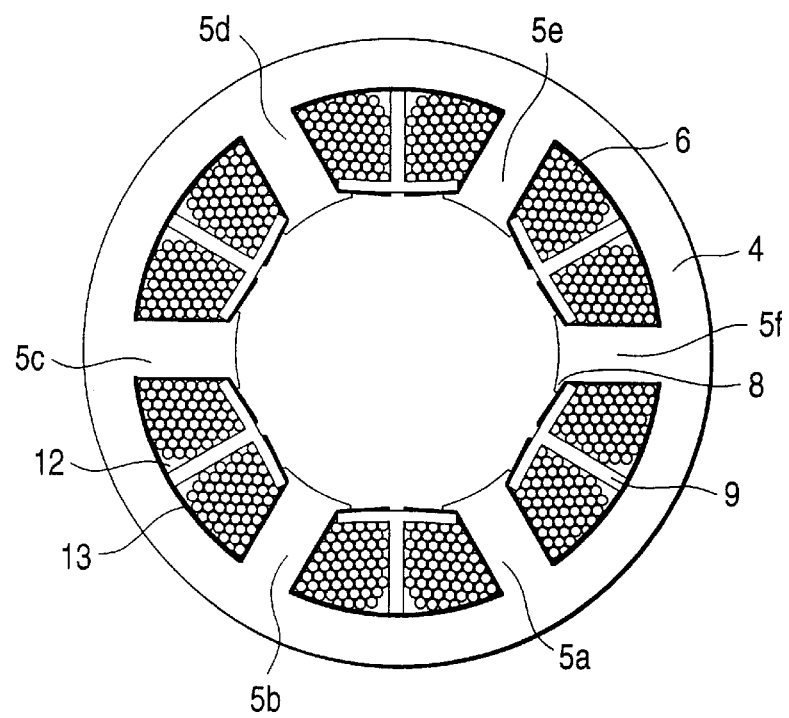
FIG. 12 is a top view illustrating the stator in accordance with an eighth embodiment of the present invention.

Hereafter, a description will be given of the reluctance motor in accordance with an eighth embodiment of the present invention. FIG. 12 is a top view illustrating the stator of the reluctance motor in accordance with the eighth embodiment, and ends of the windings are shown sectioned. In this embodiment, the winding holding member 9, which is formed from a nonmagnetic material, i.e., an insulating material, is provided in such a manner as to extend between the winding holding portions 8 of adjacent pole protrusions and between the windings 6 of different phases in the same groove. This winding holding member 9 is formed integrally, for instance, and its cross section is formed in a T-shape.

In this way, the windings 6 can be held more securely in the grooves 12, and the noise due to electromagnetic vibration of the windings 6 can be reduced.

In addition, the fitting of the winding holding members 9 can be facilitated by being formed integrally, but even if the winding holding members 9 are formed by separate members, their effect is produced.

Further, although the winding holding members 9 are respectively provided between the winding holding portions 8 of adjacent pole protrusions, even if the reluctance motor having a configuration in which the windings 6 are held by the winding holding portions 8 such as those shown in the first embodiment is provided with the winding holding members 9 between the windings 6 of different phases in the grooves 12, it is possible to obtain the effect of reducing the noise due to the electromagnetic vibration of the windings 6.

Ninth Embodiment

Figure 13:
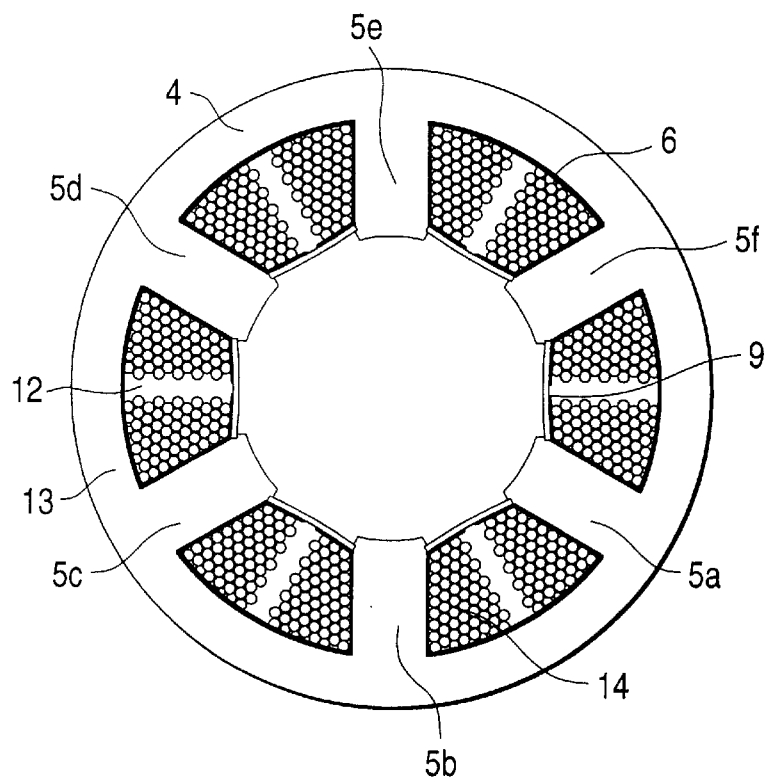
FIG. 13 is a top view illustrating the stator in accordance with a ninth embodiment of the present invention.
Figure 14:
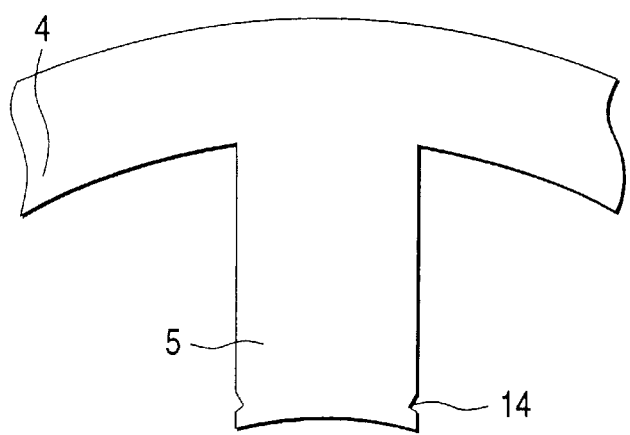
FIG. 14 is a partial enlarged top view of the stator in accordance with the ninth embodiment.
Figure 15:
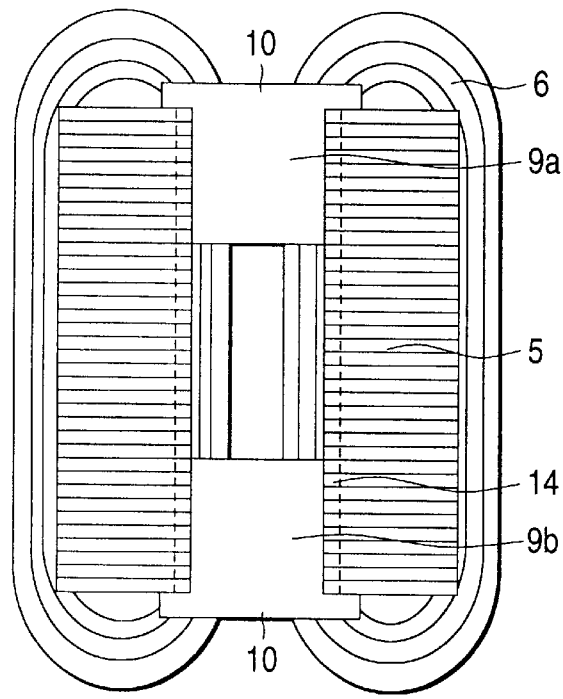
FIG. 15 is a partial side view in which pole protrusions of the stator in accordance with the ninth embodiment are viewed from the inner peripheral side.

Hereafter, a description will be given of the reluctance motor in accordance with a ninth embodiment of the present invention. FIGS. 13, 14, and 15 are diagrams illustrating the reluctance motor in accordance with the ninth embodiment. FIG. 13 is a top view illustrating the stator in accordance with this embodiment, and ends of the windings are shown sectioned. In addition, FIG. 14 is a partial enlarged top view of the stator in accordance with this embodiment, and FIG. 15 is a partial side view in which pole protrusions of the stator in accordance with this embodiment are viewed from the inner peripheral side.

In the drawings, reference numeral 4 denotes the stator; 5a, 5b, 5c, . . . , 5f denote the pole protrusions of the stator; 6 denotes the winding; 7 denotes the gap; 9, 9a, and 9b denote the winding holding members formed of an insulator; 12 denotes the groove; 13 denotes the insulating portion; 14 denotes a winding holding means which is a retaining portion for retaining the winding holding member 9, and is, for example, a slot provided over the entire axial length on each side surface of the inner peripheral-side end portion of the pole protrusion 5 of the stator.

The reluctance motor in accordance with this embodiment has a plurality of, e.g., six, pole protrusions 5a, 5b, 5c, . . . , 5f of the stator arranged at equal intervals and having equal shapes, and the slots 14 are provided on both side surfaces of the inner peripheral-side end portion of each pole protrusion 5 of the stator. The winding holding members 9a and 9b extend between the adjacent pole protrusions of the stator, and are fitted between the slots, i.e., the winding holding portions 8, and the winding 6. The winding holding members 9a and 9b are respectively arranged at the axially opposite end portions of the pole protrusion 5 of the stator.

In addition, the insulating portion 13 is disposed around the groove 12 adjacent to the pole protrusions 5a, 5b, 5c, . . . , 5f of the stator.

With the reluctance motor in accordance with this embodiment configured as described above, the windings can be held securely since the winding holding members are respectively provided at the axially opposite end portions where the largest stress is applied. In addition, as compared with the winding holding method in which the winding holding member is disposed over the entire axial length, the winding holding member 9 is provided with a necessary and minimum shape, so that the material cost of the winding holding members 9 can be reduced, thereby allowing an expensive reluctance motor to be obtained.

10th Embodiment

Figure 16:
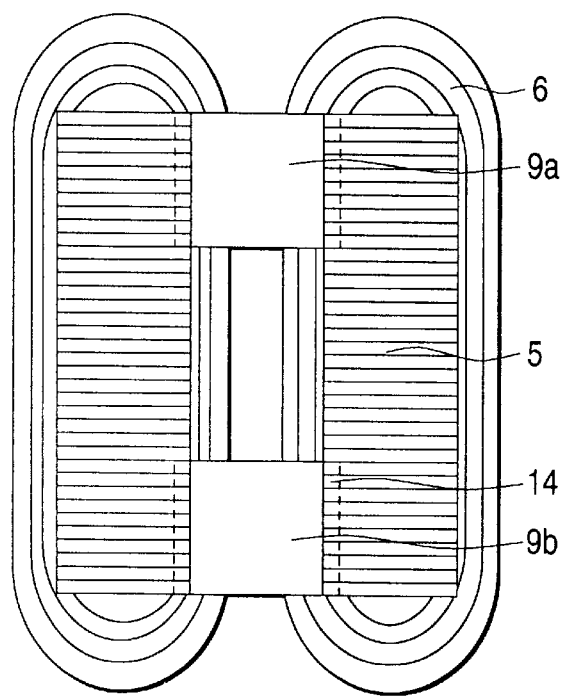
FIG. 16 is a partial side view in which pole protrusions of the stator in accordance with a 10th embodiment are viewed from the inner peripheral side.

Hereafter, a description will be given of the reluctance motor in accordance with a 10th embodiment of the present invention. FIG. 16 is a partial side view in which pole protrusions of the stator in accordance with the 10th embodiment are viewed from the inner peripheral side.

Although, in the ninth embodiment, the slots 14 are provided over the entire axial length on both side surfaces of the pole protrusion 5 of the stator, this embodiment is characterized in that the slots are provided only in the vicinities of the axially opposite end portions of the pole protrusion 5 of the stator.

With the reluctance motor configured as described above, it is also possible to obtain an effect similar to that of the ninth embodiment.

In addition, when the winding holding members 9a and 9b are respectively inserted from the axial end portions, the winding holding members 9a and 9b abut against the pole protrusion 5 portions which are not provide with the slots 14, and cannot be inserted further, so that the insertion terminates there. Accordingly, the winding holding members 9a and 9b need not be especially provided with stopper portions, and the winding holding members 9a and 9b can always be fixed at predetermined positions.

11th Embodiment

Figure 17:
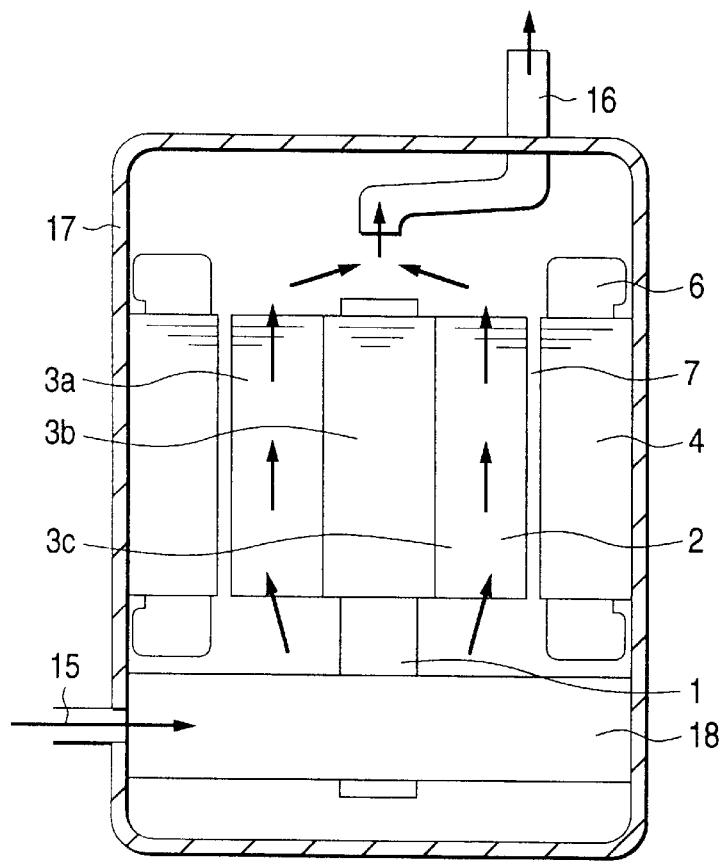
FIG. 17 is a diagram schematically illustrating a compressor-driving reluctance motor in accordance with an 11th embodiment.
Figure 18:
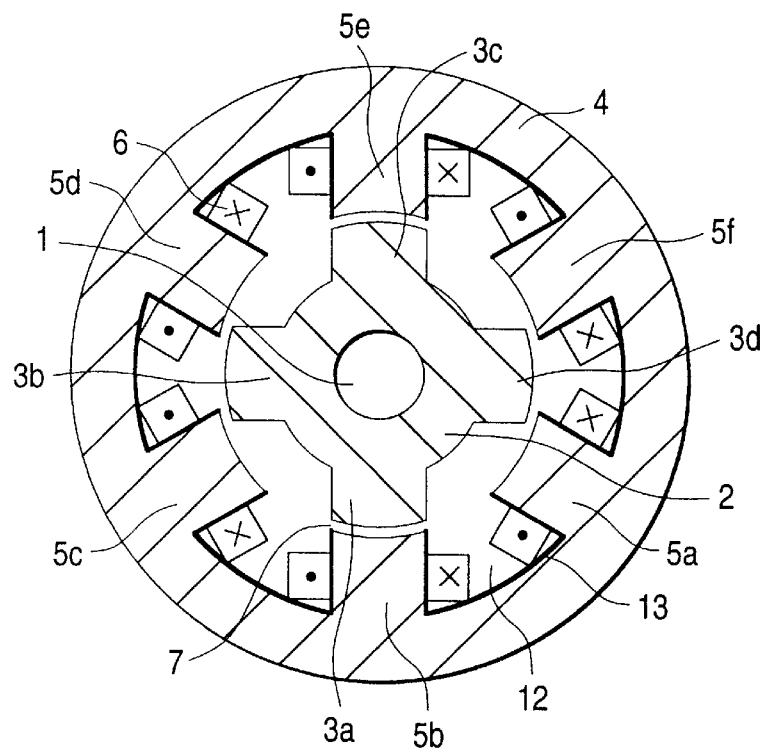
FIG. 18 is a cross-sectional view illustrating a conventional reluctance motor.
Figure 19:
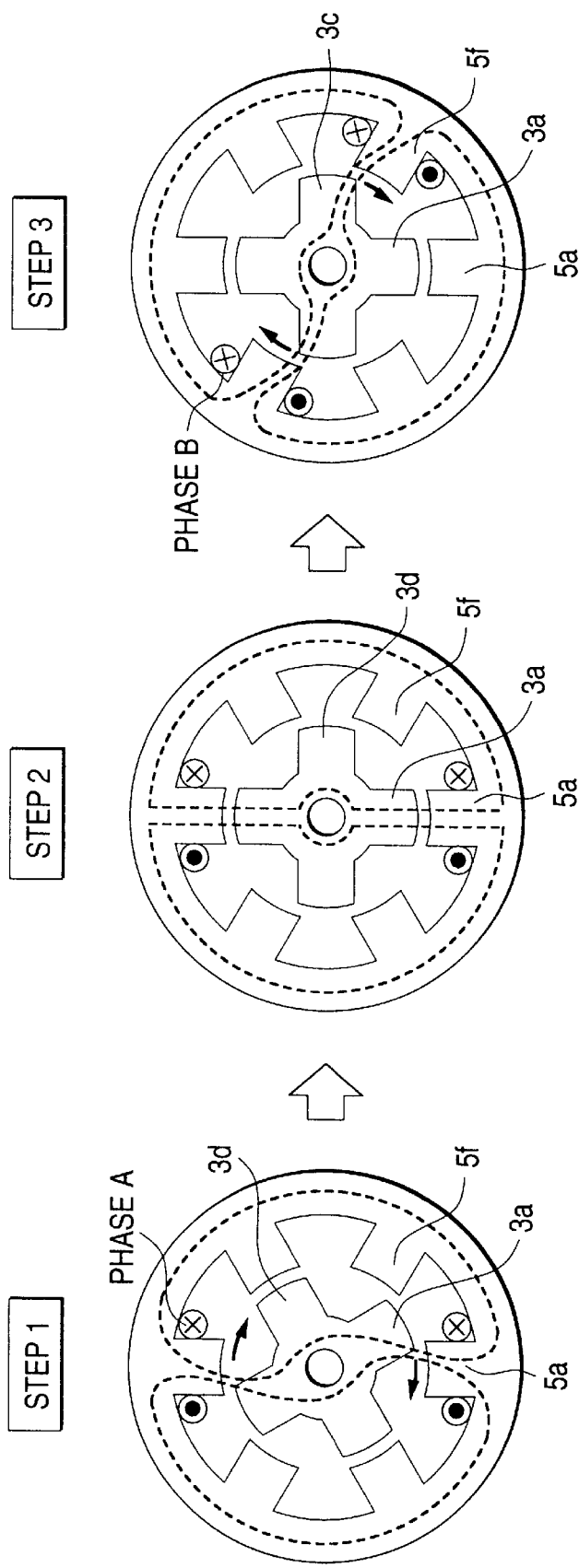
FIG. 19 is an explanatory diagram illustrating the basic principle of the driving of the reluctance motor.
Figure 20:
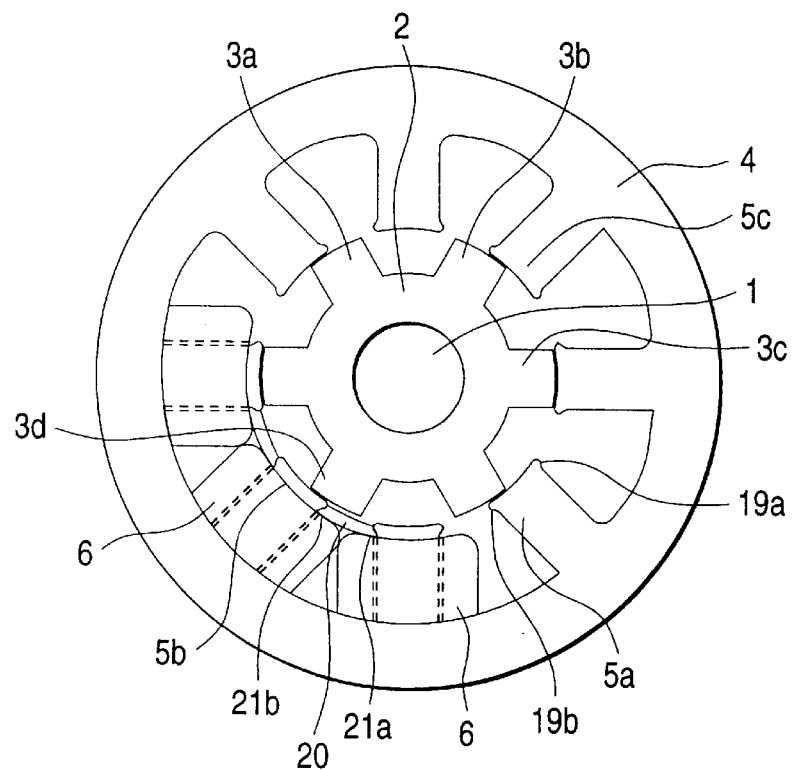
FIG. 20 is a side elevational view illustrating the schematic arrangement of the conventional reluctance motor.
Figure 21:
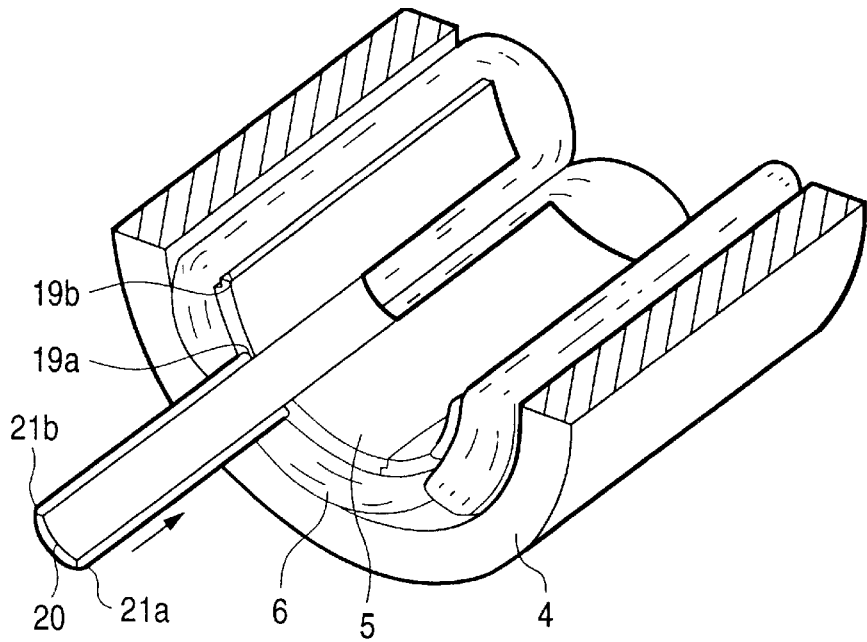
FIG. 21 is a perspective view, partly in section, illustrating the arrangement of the conventional reluctance motor.

Hereafter, a description will be given of the reluctance motor in accordance with an 11th embodiment of the present invention. FIG. 17 is a diagram schematically illustrating the compressor-driving reluctance motor in accordance with the 11th embodiment. In the drawing, reference numeral 1 denotes the rotor shaft; 2 denotes the rotor; 3a, 3b, 3c, and 3d denote the pole protrusions of the rotor; 4 denotes the stator; 6 denotes the winding; 7 denotes the gap; 15 denotes a suction pipe; 16 denotes a discharge pipe; 17 denotes a compressor casing; and 18 denotes a compressor element section. It should be noted that the cross section illustrating the reluctance motor in accordance with this embodiment is the one shown in FIG. 1.

With the reluctance motor in accordance with this embodiment, the stator 4 is disposed inside the compressor casing 17, and its outer peripheral portion is made almost completely circular. As shown in FIG. 1, this stator 4 has the plurality of pole protrusions 5 on its inner peripheral side, the winding 6 is wound around each of the pole protrusions 5, and the rotor 2 is disposed on the inner peripheral side of the stator 4 in spaced-apart relation to the inner periphery with the slight gap 7 therebetween. As shown in FIG. 1, this rotor 2 also has the plurality of pole protrusions 3 on its outer peripheral side, and gaps where a heat transfer medium, e.g., a refrigerant gas, is capable of circulating are present between adjacent ones of the pole protrusions 3. The rotating shaft 1 rotatably supports the rotor 2, and has the compressor element section 18 connected to this rotor shaft 1 for sucking and compressing the refrigerant gas.

When the motor is driven, the refrigerant gas, i.e., the heat transfer medium, passes through the suction pipe 15, is delivered to the compressor element section 18, and is compressed by the compressor element section 18. Subsequently, the compressed refrigerant gas passes through the space portions provided between the adjacent pole protrusions 3a, 3b, and 3c of the rotor 2, passes through the discharge pipe 16 provided in an upper portion of the compressor casing 17, and is discharged.

If the compressor-driving reluctance motor arranged as described above is configured as described above, it is unnecessary to provide a plurality of slotted portions in the outer peripheral portion of the stator for securing passages for the refrigerant gas as in the conventional apparatus. The reason for this is that the structure adopted is such that large gaps are respectively provided between adjacent ones of the pole protrusions 3 of the rotor, and these gaps can be utilized as the passages for the refrigerant gas, thereby making it possible to obtain a circular stator which does not require the slotted portions. As a result, leeway is provided in the width of the core back of the stator, and since the rise in the magnetic flux density of the core back of the stator can be suppressed, thereby making it possible to obtain a reluctance motor having excellent magnetic characteristics and low iron loss.

It should be noted that if the reluctance motor in accordance with any one of the first to 10th embodiments is used as the reluctance motor used in this embodiment, it is possible to allow the respective effects of the embodiments to be displayed by the compressor-driving motor.

As described above, in accordance with the first arrangement of the present invention, the reluctance motor is provided with the stator which has a plurality of pole protrusions provided on the inner peripheral side thereof and around each of which the winding is wound as well as the rotor which is disposed on the inner peripheral side of the stator and has a plurality of pole protrusions on the outer side thereof, the reluctance motor comprising: the winding holding means provided respectively at axially opposite end portions of each of the pole protrusions of the stator so as to hold the windings respectively wound around the pole protrusions on inner peripheral sides of the pole protrusions. Accordingly, the windings can be held, so that the winding operation is made simple, and the space factor can be improved to reduce the copper loss. In addition, the shape of each pole protrusion of the stator at portions other than the opposite end portions is configured in a straight shape, so that the salient pole ratio does not decline. Consequently, an advantage is offered in that a highly efficient reluctance motor can be realized.

In accordance with the second arrangement of the present invention, the reluctance motor in the first arrangement further comprises: the winding holding means provided between the axially opposite end portions of each of the pole protrusions of the stator independently of the winding holding means provided respectively at the axially opposite end portions of each of the pole protrusions of the stator. As a result, in addition to the advantage derived from the first arrangement, an advantage is offered in that a reluctance motor capable of reliably holding the windings in a motor having a large axially layered thickness, i.e., a motor in which the circumference of the winding is long.

In accordance with the third arrangement of the present invention, in the reluctance motor in the first or second arrangement, the winding holding means is constituted by the retaining portions which are respectively provided on the side surfaces of the inner peripheral-side end portion of each of the pole protrusions of the stator. Hence, in addition to the advantage derived from the first or second arrangement, there is an advantage in that it is possible to realize a highly efficient reluctance motor capable of holding the windings easily with a simple structure.

In accordance with the fourth arrangement of the present invention, the reluctance motor in the third arrangement further comprises: the winding holding members each retained by the retaining portions provided on the inner peripheral-side end portions of adjacent ones of the pole protrusions to hold the windings on the inner peripheral sides of the windings. Hence, in addition to the advantage derived from the first or second arrangement, there is an advantage in that it is possible to realize a highly efficient reluctance motor capable of holding the windings easily and reliably.

In accordance with the fifth arrangement of the present invention, in the reluctance motor in the fourth arrangement, the winding holding member at each axial end portion is inserted between the adjacent ones of the pole protrusions of the stator from the axial end portion side, and has a stopper portion indicating the termination of insertion by retaining the axial end portion and a sleeve portion which is tapered such that the radial thickness of its inserted-side distal end becomes thinner. Accordingly, in addition to the advantage derived from the fourth arrangement, there are advantages in that the insertion of the winding holding members is facilitated, and that the winding holding members can be always fixed at predetermined positions by the stopper portions, thereby making it possible to realize a reluctance motor capable of firmly holding the windings.

In accordance with the sixth arrangement of the present invention, in the reluctance motor in the fourth or fifth arrangement, each of the retaining portions is formed by a slot. Accordingly, in addition to the advantage derived from the fourth or fifth arrangement, an advantage is offered in that a highly efficient reluctance motor can be realized without utterly reducing the salient pole ratio.

In accordance with the seventh arrangement of the present invention, the reluctance motor in any one of the first to sixth arrangements further comprises: the winding holding members each disposed between adjacent ones of the windings and formed of an insulating material. Accordingly, in addition to the advantage derived from any one of the first to sixth arrangements, an advantage is offered in that it is possible to obtain a reluctance motor in which the windings can be held more securely, and noise due to electromagnetic vibration of the windings can be reduced.

In accordance with the eighth arrangement of the present invention, in the reluctance motor in any one of the third to seventh arrangements, the stator is formed by a plurality of laminated plates which are laminated in the axial direction, and the laminated plates at each of the axially opposite end portions are arranged such that the laminating plates provided with the retaining portions on the side surfaces of the inner peripheral-side end and the laminating plates having straight side surfaces are alternately laminated in units of one or more plates of the same kind to constitute the winding holding means. Accordingly, in addition to the advantage derived from any one of the third to seventh arrangements, an advantage is offered in that the proportion of the pole protrusion portions of the stator having the winding holding portions with respect to the axial length is reduced, and the salient pole ratio can be improved, thereby making it possible to realize a reluctance motor having higher efficiency.

In accordance with the ninth arrangement of the present invention, there is provided a compressor-driving reluctance motor comprising: the reluctance motor provided with the stator which has a plurality of pole protrusions provided on the inner peripheral side thereof and around each of which the winding is wound as well as the rotor which is disposed on the inner peripheral side of the stator and has a plurality of pole protrusions on the outer side thereof; the casing for accommodating the reluctance motor; the suction pipe for introducing a heat transfer medium into the casing; and the discharge pipe for leading the heat transfer medium out of the casing, wherein the outer peripheral portion of the stator of the reluctance motor is made almost completely circular, and the heat transfer medium introduced from the suction pipe is circulated through the gap between the stator and the rotor, and is led out from the discharge pipe. Accordingly, an advantage is offered in that the rise in the magnetic flux density of the core back of the stator can be suppressed, thereby making it possible to obtain a reluctance motor having excellent magnetic characteristics and low iron loss.

What is claimed is:

1. A reluctance motor, comprising:

a stator having a plurality of pole protrusions provided on an inner peripheral side thereof and around each of which a winding is wound as well as a rotor which is disposed on the inner peripheral side of said stator and has a plurality of pole protrusions on an outer side thereof; and winding holding means provided respectively at axially opposite end portions of each of said pole protrusions of said stator so as to hold the windings respectively wound around said pole protrusions on inner peripheral sides of said pole protrusions;

further comprising:

additional winding holding means provided between the axially opposite end portions of each of the pole protrusions of the stator independently of said winding holding means provided respectively at axially opposite end portions of each of said pole protrusions of said stator.

2. A reluctance motor, comprising:

a stator having a plurality of pole protrusions provided on an inner peripheral side thereof and around each of which a winding is wound as well as a rotor which is disposed on the inner peripheral side of said stator and has a plurality of pole protrusions on an outer side thereof; and winding holding means provided respectively at axially opposite end portions of each of said pole protrusions of said stator so as to hold the windings respectively wound around said pole protrusions on inner peripheral sides of said pole protrusions, wherein the winding holding means is not provided over entire lengths of said pole protrusions;

wherein said winding holding means is constituted by retaining portions which are respectively provided on side surfaces of an inner peripheral-side end portion of each of said pole protrusions of said stator;

further comprising:

winding holding members each retained by retaining portions provided on the inner peripheral-side end portions of adjacent ones of said pole protrusions to hold the windings on inner peripheral sides of the windings;

wherein the winding holding members are disposed at axially opposite end portions of each pole protrusion, and a middle portion of each pole protrusion is not axially coextensive with the winding holding members disposed at the axially opposite end portions.

3. The reluctance motor according to claim 2, wherein said winding holding member at each axial end portion is inserted between the adjacent ones of said pole protrusions of said stator from an axial end portion side, and has a stopper portion indicating the termination of insertion by retaining the axial end portion and a sleeve portion which is tapered such that the radial thickness of its inserted-side distal end becomes thinner.

4. The reluctance motor according to claim 2, wherein each of said retaining portions is formed by a slot.

5. A reluctance motor, comprising:
   a stator having a plurality of pole protrusions provided on an inner peripheral side thereof and around each of which a winding is wound as well as a rotor which is disposed on the inner peripheral side of said stator and has a plurality of pole protrusions on an outer side thereof; and
   winding holding means provided respectively at axially opposite end portions of each of said pole protrusions of said stator so as to hold the windings respectively wound around said pole protrusions on inner peripheral sides of said pole protrusions;
   further comprising:
      winding holding members each having a first member which joins a middle portion of a second member to form a T-shape, the first member being disposed between adjacent ones of the windings and formed of an insulating material and the second member bridging adjacent pole protrusions.

6. A reluctance motor, comprising:
   a stator having a plurality of pole protrusions provided on an inner peripheral side thereof and around each of which a winding is wound as well as a rotor which is disposed on the inner peripheral side of said stator and has a plurality of pole protrusions on an outer side thereof; and
   winding holding means provided respectively at axially opposite end portions of each of said pole protrusions of said stator so as to hold the windings respectively wound around said pole protrusions on inner peripheral sides of said pole protrusions;
   wherein said winding holding means is constituted by retaining portions which are respectively provided on side surfaces of an inner peripheral-side end portion of each of said pole protrusions of said stator;
   wherein said stator is formed by a plurality of laminated plates which are laminated in the axial direction, and the laminated plates at each of the axially opposite end portions are arranged such that laminating plates provided with the retaining portions on the side surfaces of the inner peripheral-side end and laminating plates having straight side surfaces are alternatively laminated in units of one or more plates of a same kind to constitute said winding holding means.

* * * * *

UNITED STATES PATENT AND TRADEMARK OFFICE
CERTIFICATE OF CORRECTION

PATENT NO. : 6,008,563
DATED : December 28, 1999
INVENTOR(S) : Kazuhiko Baba; Hitoshi Kawaguchi; Yoshio Takita; Hayato Yoshino It is certified that error appears in the above-identified patent and that said Letters Patent is hereby corrected as shown below:

On the face of the patent, in the U.S. PATENT DOCUMENTS section, please insert the following:
-- 5,877,568 03/1999 Maes et al.
    5,877,572 03/1999 Michaels et al.--

On the face of the patent, in the FOREIGN PATENT DOCUMENTS section, please insert the following:
-- WO 92/10021 06/1992 PCT
    0 735 651   10/1996 EPO
    2 311 170   09/1997 United Kingdom--.

Signed and Sealed this

Twenty-fourth Day of April, 2001

*Attest:*

NICHOLAS P. GODICI

*Attesting Officer*     Acting Director of the United States Patent and Trademark Office